United States Patent
Van Bijnen et al.

(10) Patent No.: US 7,916,418 B2
(45) Date of Patent: Mar. 29, 2011

(54) APPARATUS AND METHOD FOR CONTROLLING THE ROTATION VELOCITY OF AN OPTICAL DISC

(75) Inventors: Joop Van Bijnen, Eindhoven (NL); Gian Hoogzaad, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 439 days.

(21) Appl. No.: 11/915,634

(22) PCT Filed: May 17, 2006

(86) PCT No.: PCT/IB2006/051560
§ 371 (c)(1),
(2), (4) Date: Nov. 27, 2007

(87) PCT Pub. No.: WO2006/129219
PCT Pub. Date: Dec. 7, 2006

(65) Prior Publication Data
US 2008/0198498 A1    Aug. 21, 2008

(30) Foreign Application Priority Data
Jun. 2, 2005  (EP) .................................... 05104795

(51) Int. Cl.
*G11B 15/46* (2006.01)
(52) U.S. Cl. .................................................... 360/73.01
(58) Field of Classification Search .................. 369/267, 369/189, 232, 47.36, 47.38, 53.41, 114, 44.11, 369/44.39, 30.03, 30.1, 30.17; 360/73.01, 360/71, 73.03
See application file for complete search history.

(56) References Cited

U.S. PATENT DOCUMENTS

| | | | |
|---|---|---|---|
| 4,794,406 A * | 12/1988 | Niemeyer, III | 346/139 R |
| 5,303,215 A | 4/1994 | Dewar et al. | |
| 5,317,241 A | 5/1994 | Hans | |
| 5,633,569 A | 5/1997 | Chloupek et al. | |
| 5,633,570 A | 5/1997 | Motzko | |
| 5,946,155 A | 8/1999 | Tochiyama | |
| 5,990,641 A * | 11/1999 | Van Buul et al. | 318/400.04 |
| 6,023,140 A | 2/2000 | Joo et al. | |
| 6,282,156 B1 * | 8/2001 | Ma | 369/44.28 |
| 6,525,465 B1 | 2/2003 | Fujita | |
| 7,116,611 B2 * | 10/2006 | Yokoyama | 369/44.35 |
| 7,545,729 B2 * | 6/2009 | Yamamoto et al. | 369/275.3 |

(Continued)

FOREIGN PATENT DOCUMENTS

EP    0464646 A2    1/1992

(Continued)

OTHER PUBLICATIONS

ISR/Written Opinion of the International Searching Authority PCT/IB2006/051560.

*Primary Examiner* — Fred Tzeng

(57) ABSTRACT

Method and apparatus for controlling the rotation velocity of an optical disc in a wide range of velocities, including low velocities. In a first range of velocities, a first sensor, for example an EMF sensor, is used to control the commutation moments of a turntable motor. For velocities outside the first range, a periodic control signal based on a periodic second signal generated by a second sensor and a mapping between the first and second periodic signal are used. The method and the apparatus are suitable for LightScribe™ applications.

27 Claims, 4 Drawing Sheets

U.S. PATENT DOCUMENTS

| | | | |
|---|---|---|---|
| 2005/0195717 A1* | 9/2005 | Lai et al. | 369/53.16 |
| 2005/0213446 A1* | 9/2005 | Tanaka et al. | 369/47.4 |
| 2006/0022621 A1 | 2/2006 | Mine et al. | |
| 2006/0210099 A1 | 9/2006 | Takahata et al. | |
| 2006/0243469 A1* | 11/2006 | Webster | 173/217 |
| 2007/0002712 A1* | 1/2007 | Chen et al. | 369/53.41 |
| 2007/0258604 A1 | 11/2007 | Bosnecker | |

FOREIGN PATENT DOCUMENTS

| | | |
|---|---|---|
| EP | 1542064 | 6/2005 |
| WO | 02082858 | 10/2002 |
| WO | 2004025644 | 3/2004 |
| WO | 2004098231 | 11/2004 |
| WO | 2005009074 | 1/2005 |
| WO | 2006003166 | 1/2006 |

* cited by examiner

APPARATUS AND METHOD FOR CONTROLLING THE ROTATION VELOCITY OF AN OPTICAL DISC

The present invention relates to a method for controlling a rotation velocity of an optical disc according to claim 1. This invention also relates to an apparatus for controlling a rotation velocity of an optical disc as described in claim 11.

With respect to the rotation speed of an optical disc, present optical disc drives have been optimised for high rotation speeds (>10.000 revolutions per minute/RPM). Further optimisations are still going on, especially in the area of reducing production costs. This means that the present turntable motors are being optimised for high speeds (>10.000 RPM) at a low production prices. Most conventional turntable motors in optical drives are brushless motors, using electronic commutation of the relative phase of the currents running through the motor coils to control the rotation velocity of the motor. Detecting the commutation moments is achieved by back sensing the electromotive force (EMF) induced in the motor coils. The magnitude of the signal generated by an EMF sensor is proportional to the angular rotation velocity of the motor. Consequently, EMF sensors cannot be used if very low rotation velocities (for example <100 RPM) are desired, as the magnitude of the EMF signal falls below the detection limit.

Notably, a novel feature for an optical disc (for example CD, DVD) has been proposed, known under the name LightScribe™: the label side (non-data side) is modified such that it allows the use of the laser beam system of the optical disc drive, used in recording/reading data from the optical disc, to inscribe a label on the label side of the optical disc. The positioning of the laser beam with respect to the optical disc while inscribing a label is controlled by a second optical system detecting periodic marks pre-recorded on the label side of the optical disc. The LightScribe™ application in particular requires control of the optical disc rotation in the limit of very low velocities, while the optical disc data reading or recording applications require the use of high disc velocities.

The use of Hall sensors for controlling the rotation velocity of the drive allows the control in a wider range of rotation velocities, including low velocities, but has the disadvantages of increased complexity and higher fabrication costs.

WO-2004025644 addresses the problem of motor miniaturization and discloses an optical disc drive well suited for SFFO (Small Form-Factor Optical) disc. The disclosed optical disc drive makes use of periodic marks written on the disc to generate a periodic signal that is used to control the commutation moments. The commutation moments need to be in phase with the relative position of the rotating motor windings with respect to the fixed stator of the motor. However, optical discs are removable, hence the position of the marks on the disc with respect to the rotor cannot be known apriori. WO-2004025644 suggests the determination of the relative position of the marks on the disc with respect to the rotor by a method known by the person skilled in the art under the name synchronous or blind start-up. This relies on forcing a rotating magnetic field on the stator by changing the phase of the current with a given frequency. If the load on the motor is low and constant in time, this results in the motor rotating at the given frequency and the said relative position can be measured. Consequently, the solution disclosed in WO-2004025644 can be used only if the load on the motor is low and constant in time. In standard optical disc drives, typical loads are high and there are high variations in the load, ranging from 3 up to 60 kgmm².

It is an object of the invention to provide an improved method for controlling a rotation velocity of an optical disc, the method usable in the case both high and/or variable loads are present and a wide range of rotation velocities, including low rotation velocities, is required. The object of the invention is achieved by a method according to claim 1. Generating a first periodic signal insures that the motor rotating an optical disc may be started in a first range of velocities, independent of the load on the motor. Generating a second periodic signal and the steps of calibrating and mapping the two signals extends the velocity range accessible to the motor outside the first velocity range.

An advantageous embodiment is obtained by the measures of claim 2. If a periodic control signal, identical to the first periodic signal is generated based on the second periodical signal and the corresponding mapping, the periodic control signal may be used instead of the first periodic signal in controlling the rotation velocity of the motor, hence requiring minimal hardware modification to the motor. Preferably, the said periodic signals are used to control the commutation moments of a brushless motor, brushless motors being the preferred choice for optical disc drives.

An embodiment for the mapping step is obtained by the measures of claim 4. Determining the ratio between the frequencies of the two periodic signals and relative phase difference is the most straightforward method of implementing the mapping step.

An EMF sensor can be used as the first sensor to advantage. EMF sensors are the preferred choice for present optical disc drives, being cheap and guaranteeing the start and the functioning of the motor in the high speed regime.

An advantageous embodiment is obtained by the measures of claim 6. A separate optical sensor may be made very cheap and had the additional advantage that it does not interfere with the data path. If the invention is to be used in a LightScribe™ optical disc drive, an optical sensor detecting periodic marks present on the optical disc is already available and can be used to advantage, avoiding the costs of including additional hardware component to the optical disc drive.

A digital signal processor may be used to generate the periodic control signal to advantage. In present optical disc drives a digital signal processor is already present, among other functions also sending control signals used in controlling the rotation velocity of the optical disc. Consequently, its use in generating the periodic control signal obviates the increase in complexity and costs due to adding extra hardware components.

These and other aspect of the invention are apparent from and will be elucidated with reference to the embodiments described hereinafter.

The features and advantages of the invention will be appreciated upon reference to the following drawings, in which.

Figure 1:
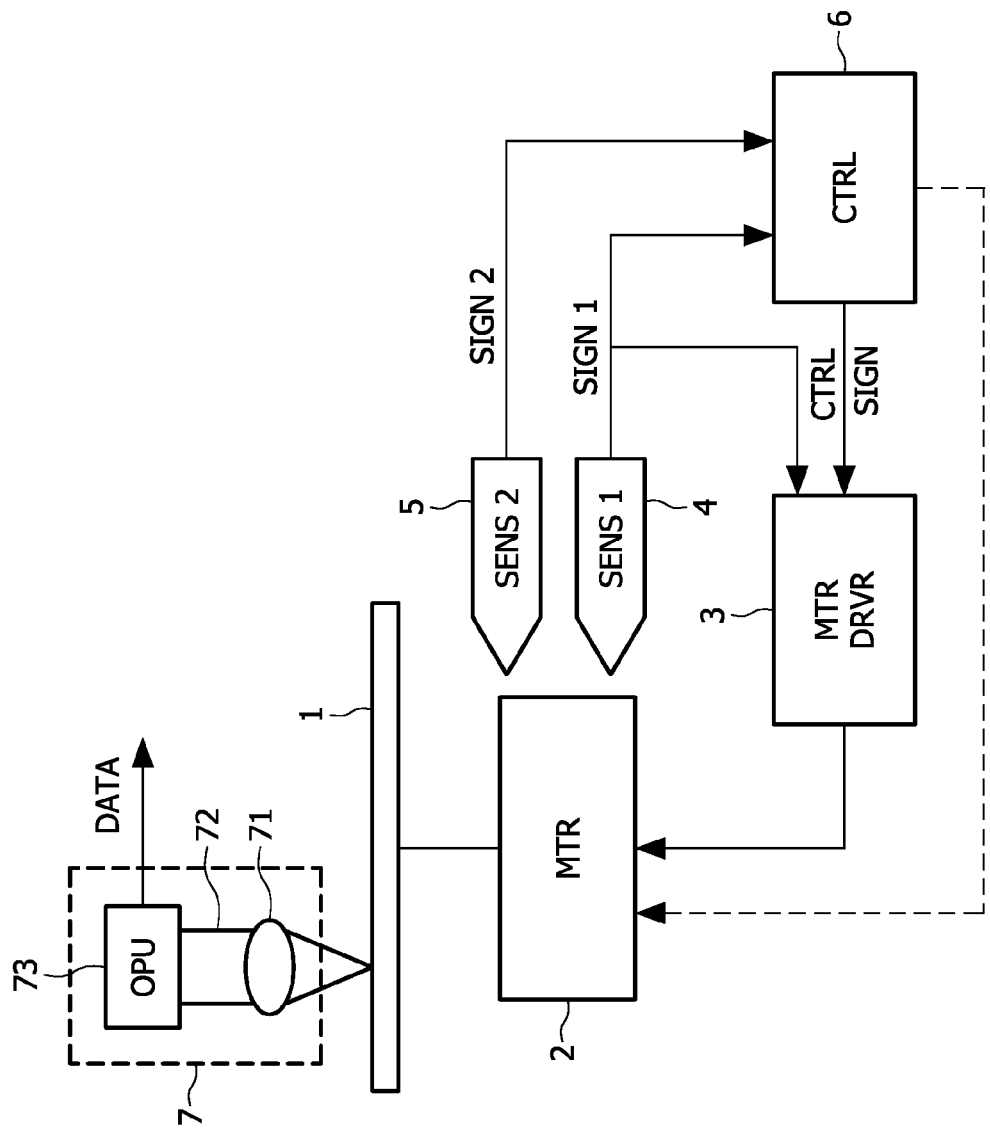
FIG. 1 shows a block diagram of an apparatus for processing data to/from an optical disc according to an embodiment of the invention.

FIG. 1 shows schematically a block diagram of an optical disc drive for processing data to/from an optical disc according to an embodiment of the invention. An optical disc (1), placed in a tray system (not shown in the figure) is rotated by a motor (2). Encoded user data is read from or recorded onto the optical disc (1) by means of an Optical Pick-Up (OPU) (7). OPU (7) generates a laser beam (72), by means of a semiconductor laser and focuses the laser beam (72) via a lens system (71) onto the optical disc (1). A reflected laser beam, modulated by the periodic structure on the optical disc (1) is detected by suitable detection means, also comprised in the OPU (7), for example a system of photodiodes. The detection means generate a high frequency signal (DATA), representing the encoded user data. Further processing of the high frequency signal (DATA) and the positioning of the OPU (7) relative to the optical disc (1) are performed according to methods known in the art for CD/DVD technology and for brevity and clarity the corresponding hardware blocks are omitted from FIG. 1.

In order to read from or record data onto the optical disc (1), it is important that the rotation velocity of the optical disc (1) is properly known and can be accurately controlled. The optical disc (1) is rotated by a motor (2) known in the art as a turntable motor. The rotation velocity of the turntable motor (2) and consequently of the optical disc (1) is controlled by a corresponding motor driver (3). In typical optical disc drives, the turntable motor (2) is a brushless motor and the motor driver (3) controls the commutation moments of the turntable motor (2). A brushless motor is rotated by applying currents through coils contained in the stator, the phase of the currents switching continuously depending of the relative position of the rotor with respect to the coils. For this purpose, the angle between the stator of the turntable motor (2) and the rotor of the turntable motor (2) needs to be known accurately. The rotor is attached to the turntable on which the optical disc (1) is fixed.

Detecting the exact moment for the commutation is achieved by a first sensor (4), generating a first periodic signal (SIGN1). For example, this sensor may be a Hall sensor or an electromotive force (EMF) sensor, detecting the electromotive force generated in the stator coils by the variation in magnetic flux generated by the passing by of the permanent magnet of the rotor. The generated periodic signal (SIGN1) is inputted to the motor driver (3). Based on said signal (SIGN1) input the motor driver controls the commutation moments of the turntable motor (2), therefore controlling the rotation velocity. The first sensor is able to detect a signal and generate a first periodic signal (SIGN1) in a first range of rotation velocities.

In addition to the first sensor (4), a second sensor (5) is also present, generating a second periodic signal (SIGN2). Several embodiments for the second sensor are possible. A first embodiment corresponds to an optical sensor adapted to detecting periodic marks arranged along a circumferential path on the optical disc (1). An optical disc (1) suitable for this purpose will be discussed later with respect to FIG. 4. An alternative embodiment corresponds to a Hall sensor detecting periodic magnetic marks on the turntable. Another alternative embodiment is obtained by deriving a second periodic signal (SIGN2) based on part of the information comprised in the high frequency signal (DATA).

If the second periodic signal (SIGN2) is obtained by detecting periodic marks on the optical disc (1), the ratio between the frequencies of the first (SIGN1) and second (SIGN2) periodic signal is equal to the ratio between the number of windings of the motor and the number of periodic marks on the optical disc (1), therefore constant and independent of the rotation velocity of the motor (2). Moreover, the phase difference between the two signals is also constant and independent of the rotation velocity of the motor (2).

Both first (SIGN1) and second (SIGN2) periodic signals are inputted to a controller (6). The controller (6) performs a mapping of the second periodic signal (SIGN2) onto the first periodic signal (SIGN1) and outputs a control signal (CTRL SIGN). The control signal (CTRL SIGN) is inputted to the motor driver (3). The mapping comprises determining and storing information comprising the frequency ratio and the relative phase difference, such that the controller (6) is enabled to generate a control signal (CTRL SIGN) identical to the first periodic signal (SIGN1) based on the stored information and the second periodic signal (SIGN2).

This mapping can be implemented as follows: a first and a second counter are initialised at the moment a commutation pulse is generated (a peak in the first periodic signal (SIGN1). The first counter counts the peaks in the first periodic signal (SIGN1) and the second counter counts peaks in the second periodic signal (SIGN2). Every time a commutation pulse is generated, the value of the second counter is recorded in a list. The number of counts of the first counter per revolution of the optical disc (1) is known and equal to the number of windings of the coil. For typical brushless motors, this number is three. The value of second counter when the optical disc (1) has performed one revolution is a measure of the frequency of the second periodic signal. The recording of counts is stopped after one revolution of the optical disc. Each counter is reset when the value of the counter reaches the value corresponding to one disc revolution. A control signal (CTRL SIGN) can be obtained by generating a pulse each time a recorded value of the second counter present in the list is achieved. Such a control signal (CTRL SIGN), generated based on the second periodic signal and the recorded list is identical to the first periodic signal (SIGN1).

When the rotation velocity of the motor is outside the functioning range of the first sensor (1) the first periodic signal (SIGN1) is not generated anymore. In this case, the controller (6) still generated a control signal (CTRL SIGN) based on the second periodic signal and the mapping that is used by the motor driver (3), instead of the first periodic signal (SIGN1), to control the commutation moments of the motor. Consequently, the rotation of the turntable motor (2) can be controlled in a range of rotation velocities outside the first range accessible to the first sensor (4), as long as the second sensor (5) is able to generate the second periodic signal (SIGN2).

Figure 2:
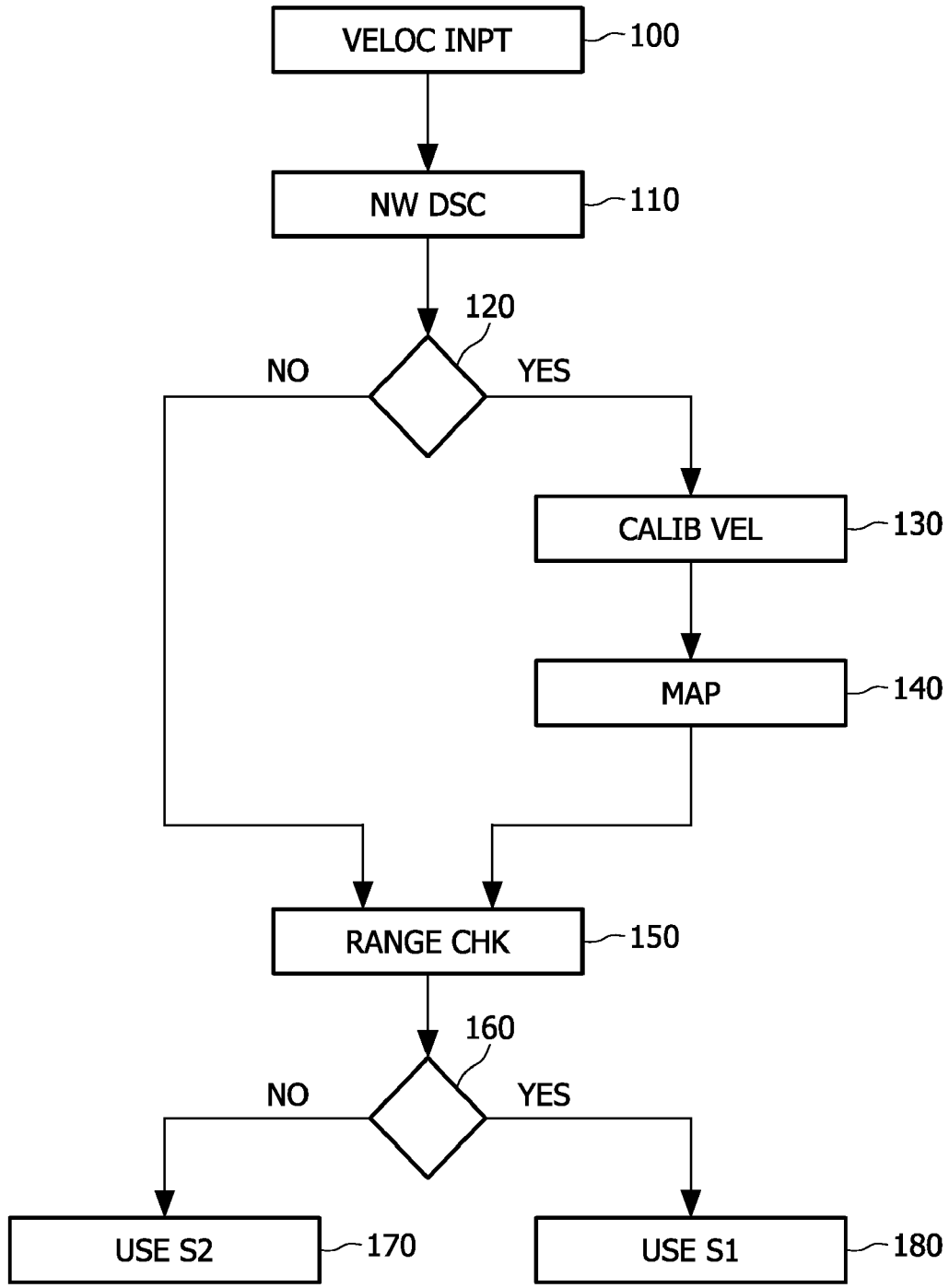
FIG. 2 illustrates by means of a flowchart a method for controlling the rotation velocity of an optical disc drive according to an embodiment of the invention.
Figure 4B:
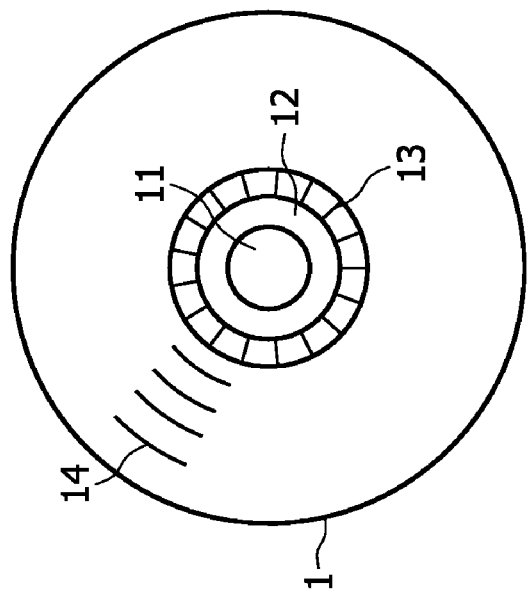
FIG. 4 shows an optical disc in cross section (4a) and a view of the label side (4b), suited for cooperating with an embodiment of the invention.
Figure 4A:
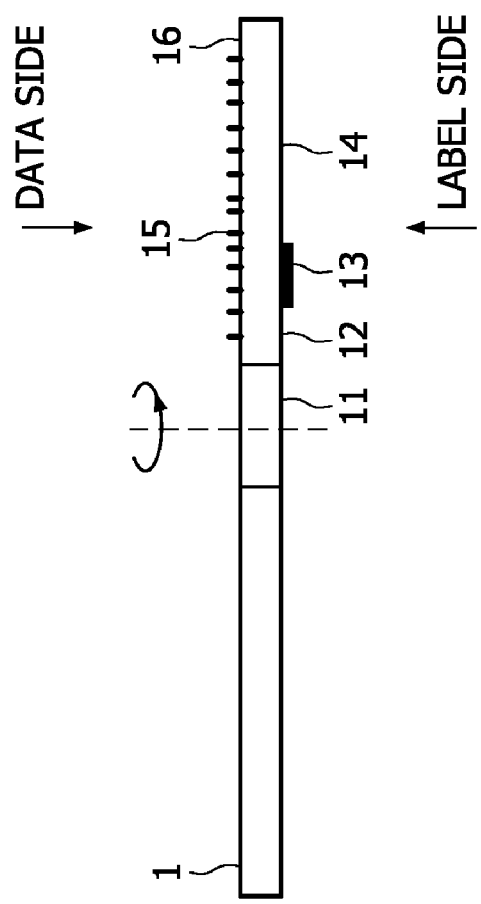

A method for controlling a rotation velocity of an optical disc according to an embodiment of the invention is further explained with reference to FIG. 2 and it comprises the following steps: In a velocity input step (100), a desired value for a rotation velocity for the optical disc (1) is inputted. The desired value is generated by a main control unit of the optical disc drive, the desired value depending on the type of application using the optical disc drive. The main control unit corresponds, for example, in the embodiment of an optical disc drive as shown in FIG. 4, to a digital signal processor (61).

In a disc check step (110), it is checked whether an optical disc (1) has just been inserted and no mapping between the second periodic signal (SIGN2) generated by the second sensor (for example, the second sensor being a dedicated optical sensor) and the first periodic signal (SIGN1) is available. This step may be implemented by means of maintaining a memory flag that is updated every time the tray is opened and a new optical disc is inserted.

If in a decision step (120) it is decided that a new optical disc has been inserted, the method proceeds to a calibration velocity step (130). Herein, the first sensor (for example, in a preferred embodiment, an EMF sensor) is used to rotate the turntable motor at a given calibration velocity, chosen such that both sensors are able to generate a periodic signal. The calibration velocity step (130) is followed by a mapping step (140). Herein a mapping of the second periodic signal (SIGN2) onto the first periodic signal (SIGN1) is performed. For example, in the preferred embodiment to be discussed further on with respect to FIG. 3, this corresponds to determining the frequency ratio and the phase difference between the two signals (TACHO IN and SYNC OUT) and generating the periodic control signal (SYNC IN).

The mapping step (140) is followed by a range check step (150). Returning to the decision step (120), if it was decide that a correct mapping is available, the decision step (120) is followed by the range check step (150). Herein, it is checked whether the desired velocity inputted in step (100) is within the rotation velocity range of the first sensor. If yes, in the decision step (160) it is decided to use the first periodic signal (SIGN 1), for example, in a preferred embodiment, the EMF signal, to control the rotation of the motor. In step (180) the motor is rotated at the desired velocity by using the first periodic signal. If no, in a decision step (160) it is decided to use the control signal to control the rotation of the motor. In step (170) the motor is rotated at the desired velocity by using the control signal.

Figure 3:
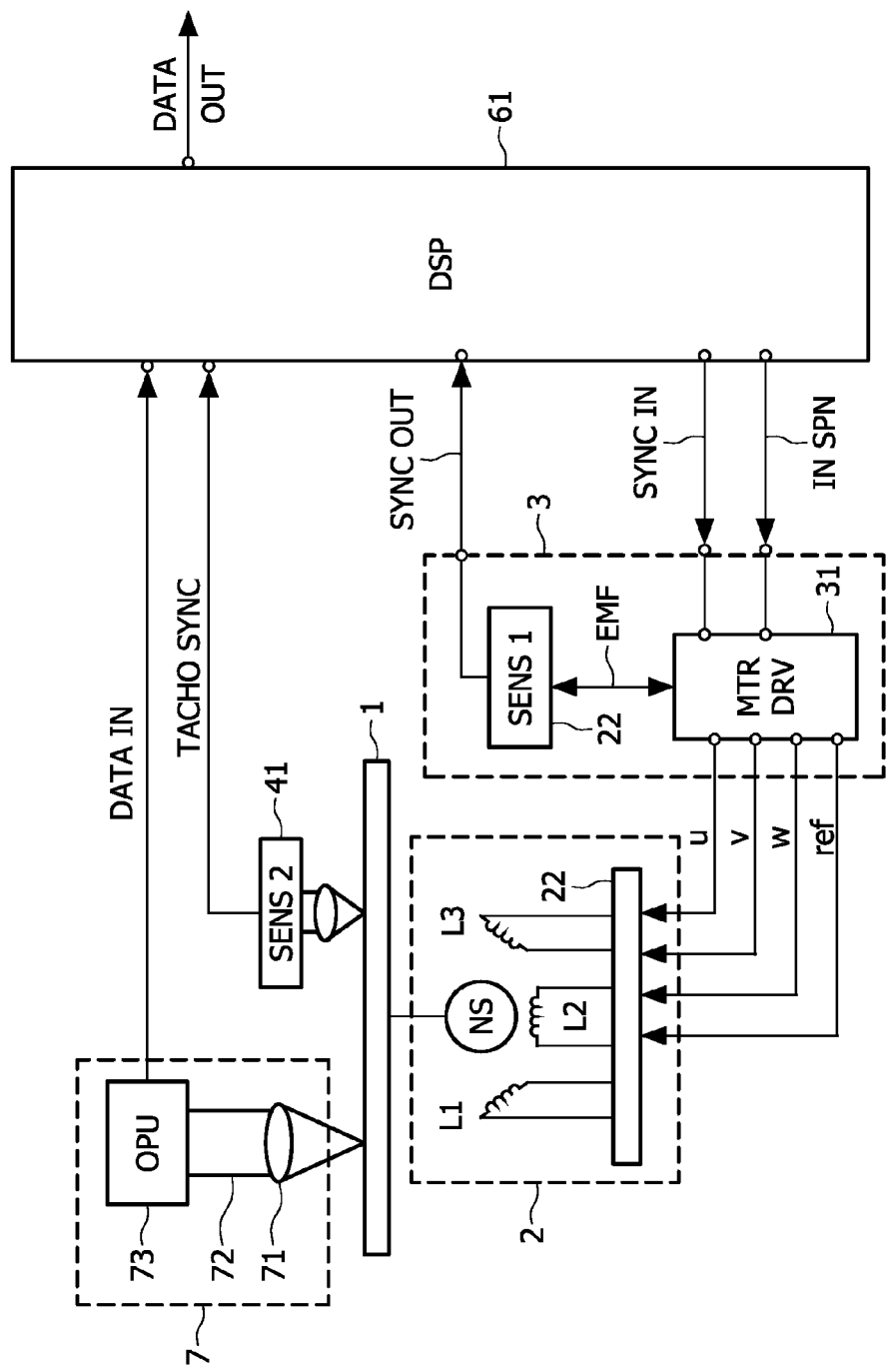
FIG. 3 shows a block diagram of an apparatus for processing data to/from an optical disc according to a preferred embodiment of the invention.

Further details of a preferred embodiment for an optical disc drive in which the invention may be practiced, especially of a preferred embodiment for the first and second sensors (4,5) and the controller (6), will be discussed with reference to FIG. 3. Throughout the figures, when the same functional element appears in the several figures, it will be denoted by the same numeral to improve clarity.

The turntable motor (2) is a typical optical motor drive, known under the name three phase brushless motor. It comprised a rotor (21), the rotor also comprising a permanent magnet, and a stator (22). The stator comprises three coil windings (L1, L2, L3). The turntable motor (2) is powered and controlled by a motor drive unit (3). The motor drive unit (3) comprises a motor driver (31) and a sensor unit (32), the sensor unit (32) comprising an EMF detection unit and back stage amplifiers (not shown in FIG. 3). The motor driver (31) generates a reference phase (ref) and three phases (u,v,w), each shifted 120° with respect to the others, used in controlling/powering the motor (2).

The motor driver (31) is controlled by a digital signal processor (DSP) (61). The DSP generate a signal know in the art as spindle-in signal (InSPN). The spindle-in signal (InSPN) is used to control the magnitude of the current running through the stator coils (L1, L2, L3) and consequently the rotation speed of the turntable motor (2). The sensor unit (32) is adapted to detect an EMF signal and generate a signal for controlling the commutation moments of the motor (2). Moreover, it also generates a signal (not directly shown in FIG. 3), known in the art as a frequency generator signal (FG), which is sent to the digital signal processor DSP (61), to be used by the DSP as information with respect to the rotation velocity of the optical disc (1). If information with respect to all three phases of each is sent, the signal is know under the name three phase frequency generator (3FG). In an embodiment, the sensor unit (32) generates a periodic SYNC OUT signal to the DSP (61) every time a commutation signal is sent to the motor (2). With the exception of a possible phase difference, the SYNC OUT signal is identical to the 3FG signal, therefore the 3FG signal can be used to advantage in an alternative embodiment.

The second sensor corresponds to a tacho sensor (41) detecting periodic marks present on the optical disc (1). Further details of an optical disc (1) that may be used in collaboration with the preferred embodiment of the invention of FIG. 3 will be discussed with reference to FIG. 4.

A typical optical disc (1) comprises a central hole (11) and a clamping zone (12) used for mounting and centering the disc in the optical disc drive. An optical disc has (1) has two sides, one side known as a data side, the other as the label side. The data side comprises a data zone (15), where user information is recorded in spiral shaped tracks, and an outer zone (16).

For applications known in the art as LightScribe™, the label side is modified such that it allows the use of the laser beam system of the optical disc drive, used in recording/reading data from the optical disc (1), to inscribe a label on the label side of the optical disc (1). The positioning of the laser beam with respect to the optical disc (1) while inscribing a label is controlled by the tacho sensor (41) detecting periodic marks (13) pre-recorded on the label side of the optical disc (1). Optical discs suitable for LightScribe™ application have a new zone defined in the inner zone of the label side, to be referred as the tacho zone. Herein, periodic radial marks (13) known under the name tacho stripes are present, to be used for positioning the laser beam with respect to the optical disc (1), as on the label side, where the spiral track is not available. Or, alternatively, other embodiments for an optical disc as described in WO-2004025644 that are making use of periodic marks written on data side of the optical disc (1) may be used to advantage.

Returning to FIG. 3, the tacho sensor (41) is a dedicated optical unit different from the Optical Pick Up unit (7) used in reading/recording user data onto the optical disc (1). The tacho sensor (41) generates a second periodic signal (TACHO SYNC), which is inputted to the Digital Signal Processor (61). The Digital Signal Processor (61) receives both SYNC OUT and TACHO SYNC signals and performs a mapping of the TACHO SYNC signal onto the SYNC OUT signal. As previously describes, the mapping may be implemented for example by means of a counter registering the number of TACHO SYNC signal detected between two SYNC-IN signals. To avoid error accumulation, the counter is reset to zero every disc rotation (three SYNC-IN periods). When the desired disc rotation velocity is too low and a SYNC-OUT signal cannot be reliably generated by the sensor unit (32), the Digital Signal Processor (61) takes over the control of the motor driver (31), by generating a SYNC-IN signal. The SYNC-IN signal, identical to the SYNC OUT signal that would have been generated by the sensor unit (32) is sent to the motor driver (31), which uses the SYNC IN signal instead of the SYNC OUT to control the motor (2).

Each time a new optical disc (1) is inserted for a light scribe application (the label side facing the OPU (7) and the tacho sensor (41)), the mapping of the TACHO SYNC and SYNC OUT signals is performed.

The invention may be applied to other systems using optical discs. These systems may use magnetic, magneto-optical, holographic or fluorescent techniques to detect marks on the disc.

It should be noted that the above-mentioned embodiments are meant to illustrate rather than limit the invention. And that those skilled in the art will be able to design many alternative embodiments without departing from the scope of the appended claims. In the claims, any reference signs placed between parentheses shall not be construed as limiting the claim. Use of the verbs "comprise" and "include" and their conjugations do not exclude the presence of elements or steps other than those stated in a claim. The article "a" or "an" preceding an element does not exclude the presence of a plurality of such elements. The invention may be implemented by means of hardware comprising several distinct elements and by means of software. In a system/device/apparatus claim enumerating several means, several of these means may be embodied by one and the same item of hardware or software. The mere fact that certain measures are recited in mutually different dependent claims does not indicate that a combination of these measured cannot be used to advantage.

The invention claimed is:

1. A method for controlling a rotation velocity of an optical disc, the method comprising the acts of:
   a first signal-generation, comprising generating a first periodic signal within a first frequency range via a first sensor;
   a first control, comprising controlling the rotation velocity of a motor controlling the rotation of the optical disc within a first velocity range, the rotation velocity control depending on the first periodic signal;
   a second signal-generation, comprising generating a second periodic signal within a second frequency range via a second sensor, the second periodic signal chosen such that:
      a constant ratio exists between a first frequency of the first periodic signal and a corresponding second frequency of the second periodic signal, independent of the rotation velocity of the motor; and
      a constant phase difference exists between a phase of the first periodic signal and a corresponding phase of the second periodic signal, independent of the rotation velocity of the motor;
   a calibration, comprising controlling the motor at a calibration rotation velocity within the first velocity range depending on the first periodic signal, the calibration velocity being chosen such that the corresponding calibration second frequency of the second periodic signal falls within the second frequency range;
   a mapping, comprising determining a relation between the second periodic signal and the first periodic signal at the calibration rotation velocity; and
   a second control, comprising controlling the motor at a desired rotation velocity outside the first velocity range depending on the second periodic signal and the determined relation between the second periodic signal and the first periodic signal.

2. The method according to claim 1, wherein the second control comprises controlling the motor rotation velocity depending on a periodic control signal, the periodic control signal being identical to the first periodic signal if the desired rotation velocity falls within the first velocity range.

3. The method according to claim 2, wherein either the first periodic signal, if the desired rotation velocity is within the first velocity range, or the periodic control signal, if the desired rotation velocity is outside the first velocity range, being used to control the commutation moments of a brushless motor.

4. The method according to claim 1, wherein the mapping comprises the determination of the constant ratio between the frequencies of the first periodic signal and the second periodic signal and the determination of the constant phase difference between the first periodic signal and the second periodic signal.

5. The method according to claim 1, wherein an electro-motive-force (EMF) sensor is used as the first sensor.

6. The method according to claim 1, wherein an optical sensor detecting periodic marks recorded on the optical disc is used as the second sensor.

7. The method according to claim 6, wherein the optical sensor is a dedicated optical sensor, different from the optical sensor used for reading user data from the optical disc.

8. The method according to claim 6, wherein the periodic marks are recorded in the inner area of the optical disc.

9. The method according to claim 8, wherein the periodic control signal is generated by the digital signal processor.

10. The method according to claim 1, wherein the determination of the relation between the second periodic signal and the first periodic signal at the calibration frequency in the mapping are performed by a digital signal processor.

11. The method of claim 1, wherein the first periodic signal is for controlling the motor during read or write or erase operations.

12. The method of claim 1, wherein the second periodic signal is for controlling the motor during operations at a lower rotational speed than read and write and erase operations.

13. An apparatus for controlling a rotation velocity an optical disc comprising:
   a motor for rotating the optical disc;
   a first sensor for measuring a motor rotation velocity, the first sensor being arranged to generate a first periodic signal in a first frequency range;
   motor-controller means, arranged to control the motor rotation velocity in a first velocity range, the control depending on the first periodic signal;
   a second sensor for measuring a disc rotation velocity, the second sensor being arranged to generate a second periodic signal in a second frequency range, second sensor chosen such that:
      a constant ratio exists between a first frequency of the first periodic signal and a corresponding second frequency of the second periodic signal, independent of the motor rotation velocity; and
      a constant phase difference exists between a phase of the first periodic signal and a corresponding phase of the second periodic signal, independent of the motor rotation velocity;
   determination means, for determining a relation between the second periodic signal and the first periodic signal at a calibration rotation velocity; and
   second controller means arranged, depending on the second periodic signal and the determined relation between the first periodic signal and the second periodic signal, to control the motor rotation velocity at a desired rotation velocity outside the first velocity range.

14. The apparatus according to claim 13, comprising signal generation means, arranged to generate a periodic control signal to be used to control the motor rotation velocity, and chosen such that the periodic control signal is identical to the first periodic signal, if the desired rotation velocity falls within the first velocity range.

15. The apparatus according to claim 14, wherein either the first periodic signal, if the desired rotation velocity is within the first velocity range, or the periodic control signal, if the desired rotation velocity is outside the first velocity range, are used to control the commutation moments of a brushless motor.

16. The apparatus of claim 15, wherein an electro-motive force (EMF) sensor is used as the first sensor.

17. The apparatus according to claim 13, wherein the determination means are arranged such that they allow the determination of the constant ratio between the frequencies of the first periodic signal and the second periodic signal and the determination of the constant phase difference between the first periodic signal and the second periodic signal.

18. The apparatus according to claim 13, wherein an electro-motive-force (EMF) sensor is used as the first sensor.

19. The apparatus according to claim 13, wherein the second sensor is an optical sensor detecting periodic marks recorded on the optical disc.

20. The apparatus according to claim 19, wherein a dedicated optical sensor is used as the optical sensor, the dedicated sensor being different from the optical sensor used for reading user data from the optical disc.

21. The apparatus according to claim 19, wherein the periodic marks are recorded in the inner area of the optical disc.

22. The apparatus according to claim 13, wherein the determination means comprise a digital signal processor.

23. The apparatus according to claim 13, wherein the periodic control signal is generated by the digital signal processor.

24. The apparatus of claim 13, wherein the first periodic signal is for controlling the motor during one of more of read and write and erase operations.

25. The apparatus of claim 13, wherein the second periodic signal is for controlling the motor during operations at a lower rotational speed than one of more of read and write and erase operations.

26. A method for controlling a rotation velocity of an optical disc, the method comprising the acts of:
   a first signal-generation, comprising generating a first periodic signal for controlling the motor during read/write/erase operations within a first frequency range via a first sensor;
   a first control, comprising using the first periodic signal to control the rotation velocity of a motor controlling the rotation of the optical disc within a first velocity range;
   a second signal-generation, comprising generating a second periodic signal for controlling the motor at a lower rotational speed within a second frequency range via a second sensor, second periodic signal chosen such that:
      a constant ratio exists between a first frequency of the first periodic signal and a corresponding second frequency of the second periodic signal, independent of the rotation velocity of the motor; and
      a constant phase difference exists between a phase of the first periodic signal and a corresponding phase of the second periodic signal, independent of the rotation velocity of the motor;
   a calibration, comprising controlling the motor at a calibration rotation velocity within the first velocity range by using the first periodic signal, the calibration velocity being chosen such that the corresponding calibration second frequency of the second periodic signal falls within the second frequency range; characterized in that the method further comprises
   a mapping, comprising determining a relation between the second periodic signal and the first periodic signal at the calibration rotation velocity; the mapping step comprising the determination of the constant ratio between the frequencies of the first period signal and the second periodic signal and by the determination of the constant phase difference between the first periodic signal and the second periodic signal; and
   a second control, comprising controlling the motor at a desired rotation velocity outside the first velocity range by using a periodic control signal, the periodic control signal determined based on the second periodic signal and the determined relation between the second periodic signal and the first periodic signal, the periodic control signal being identical to the first periodic signal if the desired rotation velocity falls within the first velocity range.

27. An apparatus for controlling a rotation velocity an optical disc comprising:
   a motor for rotating the optical disc;
   a first sensor for measuring a motor rotation velocity, the first sensor being arranged to generate a first periodic signal for controlling the motor during read/write/erase operations in a first frequency range;
   a motor-controller, arranged to using the first periodic signal to control the motor rotation velocity in a first velocity range;
   a second sensor for measuring a disc rotation velocity, the second sensor being arranged to generate a second periodic signal for controlling the motor at a lower rotational speed in a second frequency range, second sensor chosen such that:
      a constant ratio exists between a first frequency of the first periodic signal and a corresponding second frequency of the second periodic signal, independent of the motor rotation velocity; and
      a constant phase difference exists between a phase of the first periodic signal and a corresponding phase of the second periodic signal, independent of the motor rotation velocity; and
   determination means, for determining a relation between the second periodic signal and the first periodic signal at a calibration rotation velocity; the determination means adapted to determine the constant ratio between the frequencies of the first periodic signal and the second periodic signal and to determine the constant phase difference between the first periodic signal and the second periodic signal; and
   wherein the controller means are arranged to control the motor rotation velocity at a desired rotation velocity outside the first velocity range by using a periodic control signal, the periodic control signal determined based on the second periodic signal and the determined relation between the first period signal and the second periodic signal, the periodic control signal being identical to the first periodic signal if the desired rotation velocity falls within the first velocity range.

* * * * *